Aug. 23, 1949.   F. W. MEREDITH   2,479,875
APPARATUS FOR COMPARING THE NATURAL FREQUENCY
OF A MECHANICAL OSCILLATORY SYSTEM
WITH A STANDARD FREQUENCY
Filed Feb. 21, 1944   4 Sheets-Sheet 1

INVENTOR
Frederick Wm. Meredith
BY Watson, Cole, Grindle & Watson
ATTYS.

Aug. 23, 1949.    F. W. MEREDITH    2,479,875
APPARATUS FOR COMPARING THE NATURAL FREQUENCY
OF A MECHANICAL OSCILLATORY SYSTEM
WITH A STANDARD FREQUENCY

Filed Feb. 21, 1944    4 Sheets-Sheet 4

INVENTOR
Frederick Wm. Meredith
By Watson, Cole, Grindle & Watson
ATTYS.

Patented Aug. 23, 1949

2,479,875

UNITED STATES PATENT OFFICE 2,479,875

APPARATUS FOR COMPARING THE NATURAL FREQUENCY OF A MECHANICAL OSCILLATORY SYSTEM WITH A STANDARD FREQUENCY

Frederick William Meredith, Cricklewood, London, England, assignor to S. Smith & Sons (England) Limited, a British company Application February 21, 1944, Serial No. 523,343
In Great Britain June 30, 1943

14 Claims. (Cl. 73—6)

This invention relates to apparatus for comparing the natural frequency of a mechanical oscillatory system with a standard frequency. More particularly, it relates to apparatus for comparing the natural frequency of a hairspring and balance wheel for a clock or watch with a standard frequency so that it may be adjusted until it has a natural frequency equal to that of the standard.

In one well known arrangement the balance wheel to be tested is mounted above a standard balance wheel the natural frequency of which is equal to the standard frequency. The two balance wheels are set so that their spokes coincide when stationary. They are then impulsed simultaneously so that they oscillate freely and any divergence of the spokes is noted. The effective spring length of the test wheel spring is then adjusted until the spokes remain coincident when swinging freely. This arrangement, however, has the disadvantage that it requires skilled operators and imposes a great strain on the operators owing to the short period for which the wheels are oscillating.

To overcome this it has been proposed to cause the freely-oscillating wheel to close a contact, either mechanically or photo-electrically, one per cycle and so generate pulses at the natural frequency of the test wheel and these are compared with the standard frequency by any suitable method. This arrangement, however, while giving a clear indication, is complicated, can only deal with one test wheel at a time and the contact mechanism has to be adjusted after each adjustment of the test wheel.

The present invention aims at overcoming these difficulties and has as its basis the forcing of an oscillation on the test wheel of the standard frequency instead of allowing the test wheel to oscillate freely. If the natural frequency is the same as the standard frequency the test wheel will oscillate so that its displacement is 90° out of phase with the force, otherwise it will be either more or less than 90° out of phase.

According to the present invention, therefore, apparatus for comparing the natural frequency of mechanical oscillatory systems with a standard frequency comprises means for forcing the system to oscillate at the standard frequency and means for detecting or indicating phase displacement between the forced oscillations and those of the force producing them.

In one form of construction the apparatus may comprise a table adapted to receive the system to be tested, means for oscillating the table at a constant standard frequency, whereby this oscillation is forced on the system, and an index mark on the apparatus for indicating the phase displacement of the mechanical oscillating system with respect to the table. The indicating means may comprise, for example, a light flashing device arranged momentarily to illuminate the mechanical system and index mark at the same point in each cycle.

Preferably, the table is oscillated at an amplitude small compared with the amplitude of oscillations forced on the mechanical system, and the table is provided with said index mark. As indicated above, when the oscillating system has the same natural frequency as the frequencies forced upon it, it will lag 90° behind the table. Thus, if initially the system to be tested were to be disposed with a point on an oscillating part thereof in line with an index mark on the table, and the table were to be illuminated at the midtimes of the forcing oscillations, when the forced oscillations took place the aforesaid point would appear to be moved from the index mark. It is more convenient, however, to arrange that when the mechanical oscillating system has the correct frequency, the aforesaid point on the system shall appear opposite the index mark. This is accomplished by arranging the illumination to be effected at the peaks of the forcing oscillations, which should correspond to the mid-positions of the forced oscillations.

Preferably, means are provided for adjustably securing the oscillating system on the table so that a part thereof may be brought into predetermined relationship with said index markings. Also, means may be provided for varying the phase relationship of the light-flashing means with the means for vibrating the table.

In one form of construction, the resiliently mounted table is arranged to be oscillated by a master balance wheel having one end of its spring connected with the master wheel and the other end to the table, means being provided for maintaining the oscillation of the master wheel. In the case where the apparatus is employed for adjusting the periodicity of a number of balance wheels, the aforesaid resiliently mounted table is provided with a plurality of mountings fixed thereto, each adapted to carry a balance wheel, which table is provided with an index mark for each mounting.

In an alternative form of construction, also for use in adjusting the periodicity of a number of balance wheels to correspond with a standard frequency, a number of separate tables are resiliently mounted on a framework, and each is adapted to receive a balance wheel, means being provided for oscillating all the said tables at the standard frequency, and at an amplitude small compared with that ultimately forced on the balance wheels, which framework is provided with index marks opposite each table, and means for illuminating the index marks and balance wheels at a predetermined point in each oscillation.

The following is a description of two alternative forms of construction, in which.

Figure 1:
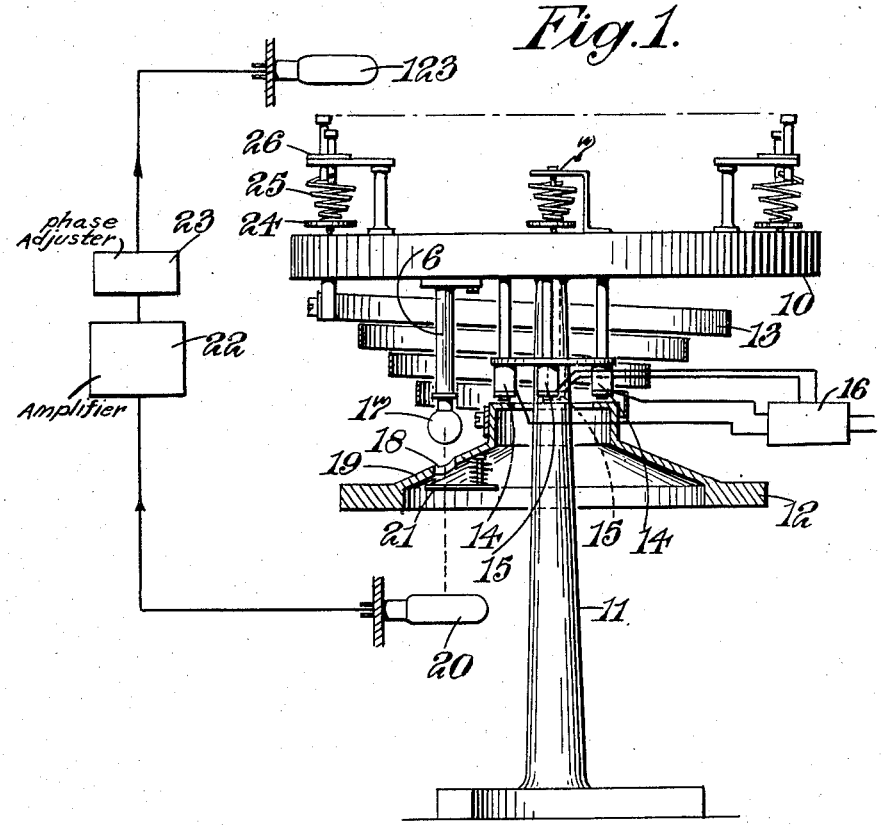
Figure 1 is a side elevation of an apparatus in which a number of balance wheels are mounted on one oscillating table.
Figure 2:
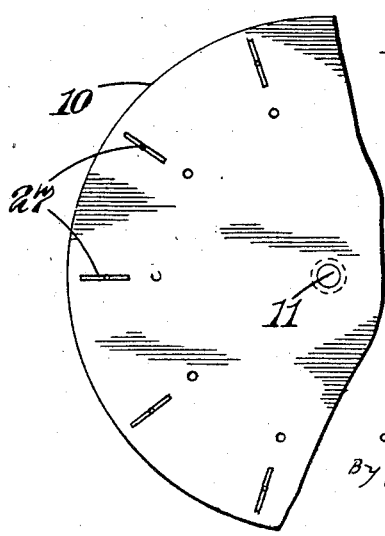
Figure 2 is a plan view of a part of the table.
Figure 3:
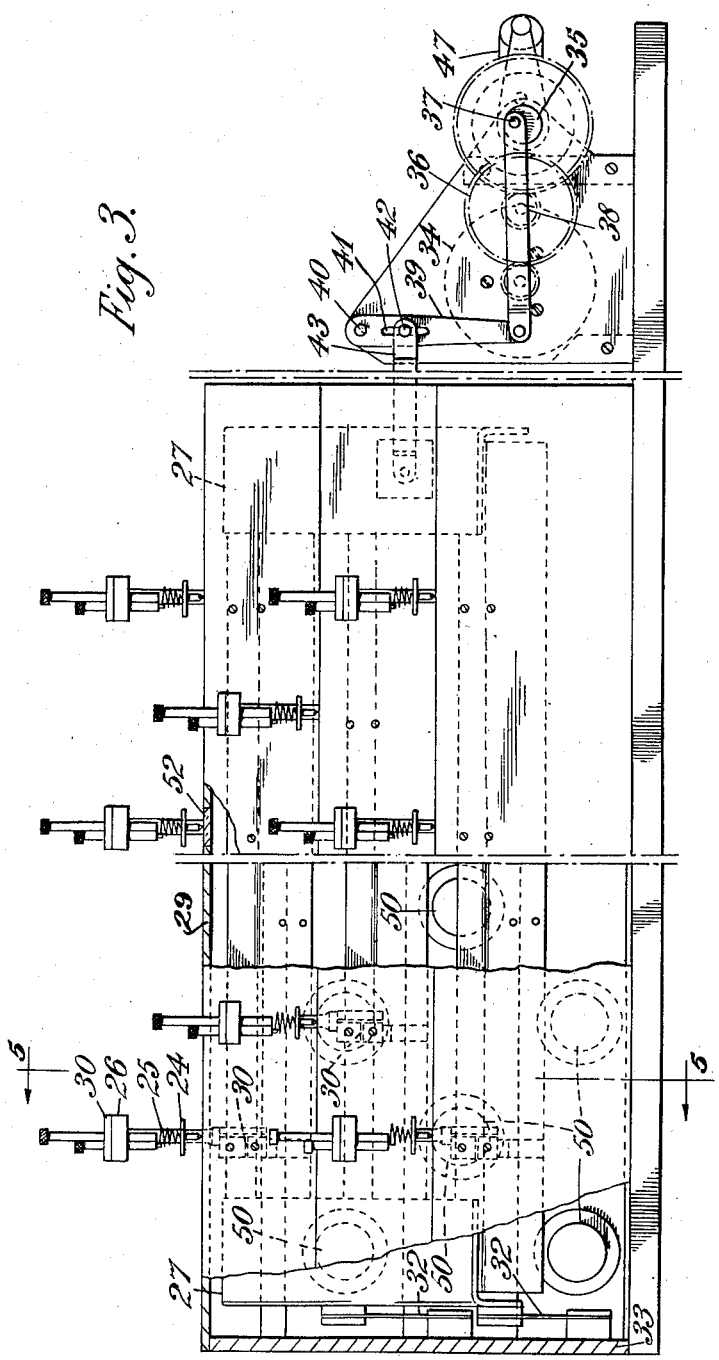
Figure 3 is a side elevation, partly in section, of an apparatus in which each balance wheel is mounted on a separate oscillatable table.
Figure 4:
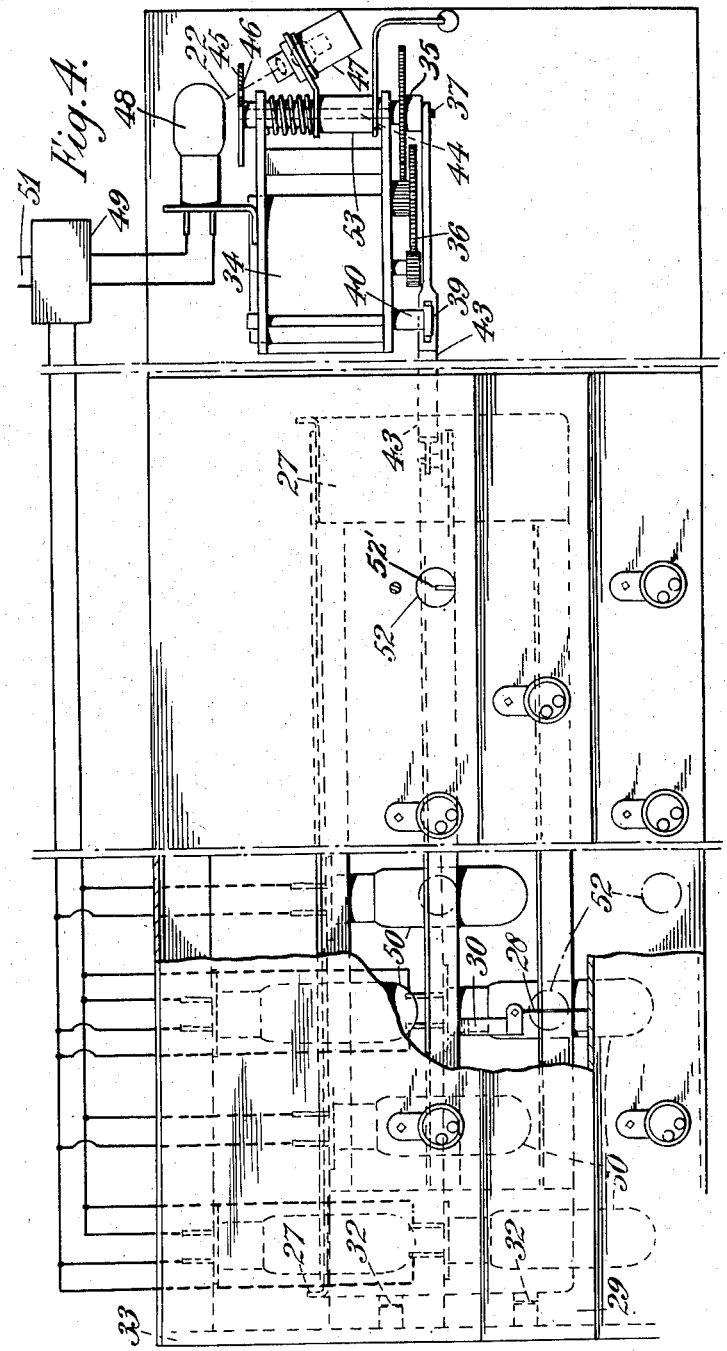
Figure 4 is a plan of the arrangement shown in Figure 3.
Figure 5:
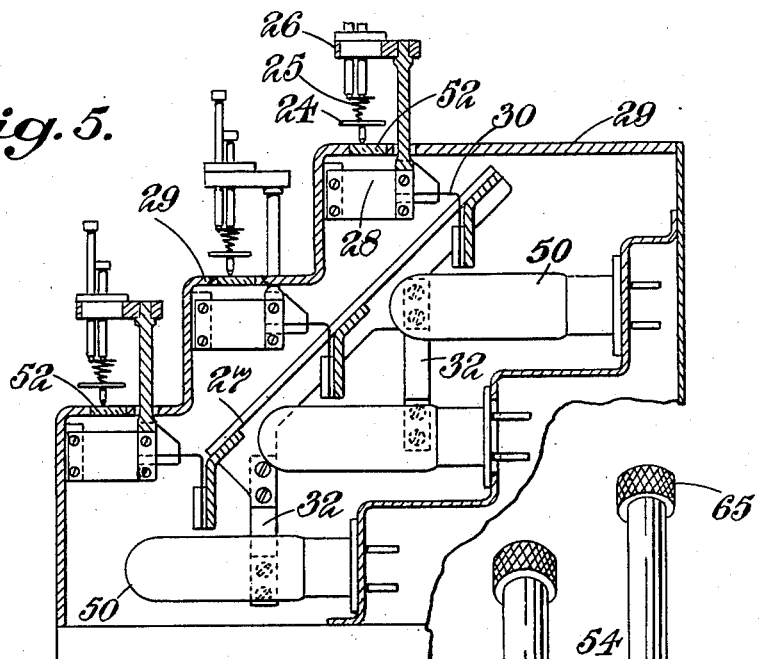
Figure 5 is a section on the line 5—5 of Figure 3.

In the construction shown in Figures 1 and 2 for testing balance wheels, a vibrating table with a circular top 10 is provided. This table has a central leg 11 which is resilient in torsion so that the table may be rotationally oscillated about this leg and has a natural frequency lower than the standard frequency. Mounted below the table top is a large master balance wheel 12 and spring 13, having a natural frequency equal to the standard frequency and having a much larger amplitude of oscillation than the table. The spring is helical spiral in configuration and is secured at one end to the balance wheel and at the other to the table so that oscillations of the master balance wheel force an oscillation of the table. The oscillations of the master balance wheel are maintained electro-magnetically about $\mp 90°$, resulting in a forced oscillation of the table of about $\pm \frac{1}{2}°$.

The electromagnet system may comprise two pairs of electromagnets 14, 15. Owing to the spiral helical formation of the spring 13, the balance wheel 12 will rise and fall during oscillation and the pair of magnets 14 is arranged to maintain this rise and fall and receive the energy from a relay or amplifier 16 which is controlled by impulses set up by the movement of the balance wheel towards and away from the magnets 15.

A beam of light is directed from a light source 17 downwards on to the balance wheel, which is provided with an aperture 18 in a web portion 19 thereof, through which the beam of light can pass to a photo-electric cell 20. The aperture is provided with a hinged shutter 21 which operates by its own inertia to close the aperture during alternate half-cycles so that the light only passes to the photoelectric cell once per cycle. The position of the source of light on the table and the aperture is arranged so that a pulse of light passes to the cell at a predetermined point of the swing of the balance wheel. The resultant pulses from the cell are amplified by the amplifier 22 which flash a neon lamp 123 so as to illuminate the table top once per cycle. Phase adjusting means 23 may be provided for adjusting the time after each pulse before the lamp flashes so that the table top may be illuminated at any desired point in the cycle.

In order to enable the flashing light to be timed to illuminate the table at an appropriate time in the cycle, a standard balance wheel is mounted on the table and the flashing light is adjusted until one of the spokes 24' of the standard balance wheel appears opposite the index mark on the table provided for that wheel. The standard balance wheel is indicated at 7 in Figure 1. Alternatively, to provide this adjustment, the lamp 17 may be carried by a support 6 which is adjustably secured to the table.

In operation, a balance wheel 24 and spring 25 to be tested, together with a holder 26 are arranged on the table so that when the wheel is stationary one of its spokes 24' lies between two datum marks 27 on the table. This is effected by an adjustment of the holder as hereinafter described. A number of wheels may be tested on the table at the same time, as the table is sufficiently massive to be unaffected by the added weight of the balance wheels.

After a suitable interval of time (during which the operator may be adjusting other test balances on the same table) the test wheel will have settled down to a forced oscillation at the standard frequency. If the natural frequency of the test wheel is the same as that of the master balance wheel it will be 90° out of phase with the table, otherwise it will lag by more or less than 90°. The flashes may be timed, for example, to illuminate a correctly adjusted balance in the middle of its swing and any error in the natural frequency will immediately be observable by the displacement of the spoke at the time it is illuminated by the flash.

Figures 3 to 6 show an alternative construction for adjusting balances of watches before mounting the balances in their movements. In this construction, a number of balances are mounted individually on small oscillating tables which are in the form of holders 26 similar to the holders referred to in the construction shown in Figure 1, which holders or tables are driven in synchronism by an oscillating frame 27. All the balances 24 and holders or tables 26 are identical and in the following description, one such system only is explained in detail.

Each balance wheel 24 is suspended by its balance spring 25 from the table or holder 26, which is attached by a cantilever spring 28 to a stationary main frame 29 so that a table can oscillate about a vertical axis. Each table or holder 26 is connected by a spring 30 to the oscillating frame 27 which is mounted on cantilever springs 32 attached to end plates 33 of the main frame 29 so as to be free to oscillate substantially in a horizontal direction. The tables or holders 26 are disposed in successively rising tiers so that all balances are within easy reach of the operator. The frame 27 is oscillated by a synchronous motor 34 which drives an eccentric 35 through suitable gearing 36. The pin 37 of the eccentric engages a link 38 which is pivotally connected to a lever arm 39 mounted to swing about a pin 40. The lever arm is provided with a slot 41 which is engaged by a pin 42 in the forked extremity of a connecting rod 43, means being provided for adjusting the pin 42 in any part of the slot. The connecting rod 43 is secured to the aforesaid oscillatable frame 27. The synchronous motor is controlled so as to run accurately at a constant speed, and by suitably selecting the gear ratio of the aforesaid gearing 36 in relation to the speed of the motor, the required frequency of oscillation of the frame may be obtained, while the amplitude of the oscillation may be governed by adjusting the pin 42 in the slot 41.

The shaft 44 which carries the eccentric 35 also has fixed to it a disc 45 having a small aperture 46 therein. A collimator 47 is arranged to direct a beam through the aperture when the latter is opposite the collimator on to a photoelectric cell 48. The cell is arranged to control a relay or amplifier 49 whereby a number of lamps 50 are simultaneously illuminated, from a source of supply 51, once every revolution of the shaft 44. The lamps are arranged to illuminate windows 52 arranged in the main frame 29, one beneath each balance wheel 24, so that the operator can see the spokes 24' of each wheel in silhouette by the illumination of the flashing lamps. Means are provided for adjusting the flash of the lamps to occur at any desired point in the cycle by mounting the collimator 47 on a carrier 53 which is rotatably adjustable in relation to the disc 45. Each window 52 is provided with datum marks 52' and a spoke on a balance wheel may be so initially disposed by adjustment of the holder about to be described, and the timing of the impulses may be so selected that when the balance wheels are correctly adjusted, a spoke appears to be still opposite the datum mark at each illumination of the lamp. This is accomplished by adjusting the collimator so that the aperture in the disc is passing it at the time when the table or holder is at a peak of an oscillation.

Figure 6:
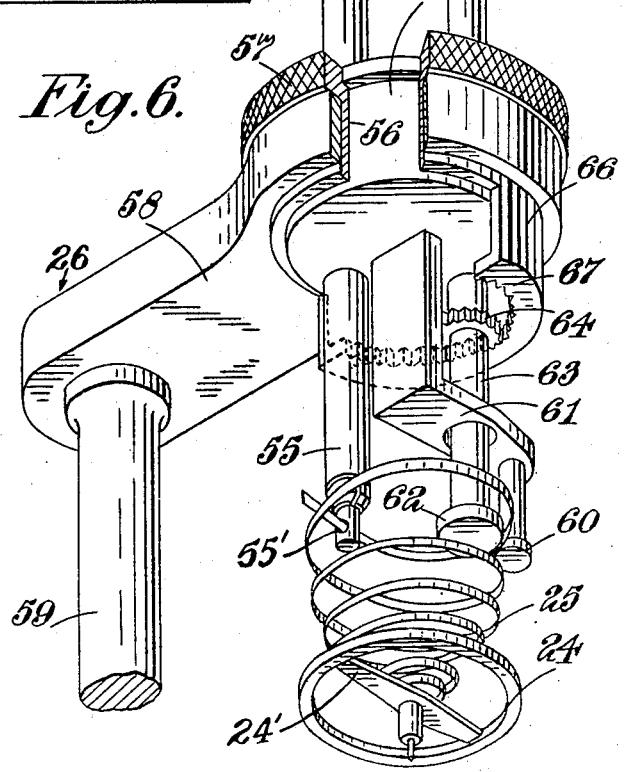
Figure 6 is a perspective view partly in section of an adjustable holder for a balance wheel.

Referring now to Figure 6, the adjustable holder 26 comprises a supporting plug 54 in which is fixed the support 55' for the anchorage post for the balance wheel spring 25. The plug is carried by and is rotatable with a sleeve 56 having a knurled manipulating rim 57. The sleeve is rotatably mounted in a bracket arm 58 carried at the upper end of a pillar 59, the lower end of which is secured to the aforesaid cantilever spring 28. Thus, by rotating the sleeve 57 the spring 25, together with its balance wheel 24, is rotated relatively to the window 52. In order to adjust the periodicity of the balance wheel, the effective length of its spring 25 may be altered in the following manner. A convolution of the spring is arranged to be gripped between a small roller 60, on an arm 61 fixed to the aforesaid plug member 54, and a larger cylindrical head 62 secured to a shaft 63 which also carries a pinion 64 and a manipulating knob 65. The pinion 64 engages an arcuate rack 67 formed on an extension 66 of the sleeve 56. With this arrangement, rotation of the cylindrical head 62 will cause the end of the spring 25 to be moved into or out of the hole at the end of the anchorage 55'. This would result in the balance wheel being rotated slightly, relative to the index mark, about a vertical axis, and in order to compensate this, the aforesaid pinion 64 rotates the sleeve 56 and with it the plug 54, and this moves the whole assemblage about the vertical axis in the opposite direction and to the same extent as that in which the balance wheel 10 is moved by the adjustment of the anchorage spring.

I claim:

1. An apparatus for comparing the natural frequency of a mechanical resilient oscillatory system with a standard frequency, comprising an oscillatably mounted table having index markings and arranged to have a natural frequency less than the standard frequency, a balance wheel, a spring for the balance wheel arranged to provide it with a frequency of oscillation equal to said standard frequency, one end of which spring is anchored to the balance wheel and the other to the table, means for imparting oscillations to said balance wheel of a constant amplitude, means rigidly supporting one point of said oscillatory system upon said table from which the remainder is free to oscillate and whereby the oscillations of said table are transmitted to said system, and means for indicating the displacement of an oscillating part of said system from the index markings at a given moment in each cycle of movement of said table.

2. An apparatus for comparing the natural frequency of a resilient oscillating system with a standard frequency, comprising a table, an oscilatable mounting for said table such that the table has a natural period of oscillation less than that of the standard frequency, a spring operated balance wheel arranged to have a natural period of oscillation equal to that of the standard frequency, means for applying a reaction force from the spring of said balance wheel to said oscillating table, means supporting said system on said table to freely oscillate thereon, an index marking on said table, a lamp adapted to illuminate index markings and the mechanical oscillating system on the table, and means controlled by the relative movement between said table and the balance wheel for flashing said lamp every alternate time that two points on the oscillating table and the balance wheel respectively cross one another.

3. An apparatus for comparing the natural frequency of a resilient mechanical oscillating system with a standard frequency comprising a table, an oscillatable mounting for said table such that the table has a natural frequency less than the standard frequency, a spring controlled balance wheel arranged beneath the table, an oscillatable mounting for said balance wheel such that the balance wheel has a natural frequency equal to the standard frequency, which table and balance wheel are mounted to oscillate about a common axis, means for imparting a reaction force from the spring of said balance wheel to the table, a light mounted on the under-side of the table and directed on to the rim of the balance wheel, which rim is provided with an aperture arranged to be traversed by said light, a hinged shutter mounted on said rim so as to close said aperture by inertia during alternate half-cycles, a photo-electric cell arranged on a fixed part of the apparatus on the opposite side of said rim to said light, another light arranged above the table means controlling the source of illumination of said second light in accordance with the responses of said photo-electric cell so as to flash said last named light at a predetermined point in the cycle, means on said table for supporting a test system so that it is free to oscillate and whereby the oscillations of said table are transmitted to said system, and markings on said table adjacent said system, all whereby displacement of an oscillatable part of said system from said markings at the moment of illumination may be indicated.

4. An apparatus for comparing the natural frequency of mechanical resilient oscillatory systems with a standard frequency, said apparatus comprising, in combination, a table, means for rotationally oscillating said table about a vertical axis at said standard frequency, means for supporting a plurality of systems to be tested upon said table so that their normal axes of oscillation are parallel with the axis of oscillation of said table and so that the oscillatory motion of said table sets up oscillations in said system, index markings on said table adjacent the oscillatory parts of said systems, and means for indicating the displacement of oscillating parts of said systems from said index markings at a given moment in a cycle of movement of said table.

5. An apparatus as set forth in claim 3 in which the means for controlling the source of illumination for said second named light comprises a manually settable current phase adjusting means, and in which there is provided a standard oscillatory system of the same type as that being tested, also mounted on said table adjacent one of said marks, whereby the phase of the light source control may be adjusted so that the light is flashed at a point in the cycle corresponding to that at which the standard oscillatory system coincides with its mark.

6. An apparatus for comparing the natural frequency of a mechanical resilient oscillatory system with a standard frequency, said apparatus comprising, in combination, means for supporting said system so that it may oscillate freely and whereby oscillations of said supporting means are transmitted to said system, means for oscillating said supporting means at said standard frequency, a source of light, a shutter device arranged to be moved in synchronism with said last named means, a photo-electric cell beyond said shutter device, a second source of light adapted to flash in synchronism with the impulses received by said cell by way of said shutter device, and markings on said supporting means adjacent said system, whereby displacement of an oscillatory part of said system from said markings may be determined.

7. An apparatus for comparing the natural frequency of a mechanical resilient oscillatory system with a standard frequency, said apparatus comprising, in combination, means for supporting said system so that it may oscillate freely and whereby oscillations of said supporting means are transmitted to said system, a constant speed motor, means operatively connecting said motor with said supporting means to oscillate the latter at said standard frequency, a source of light, a shutter device arranged to be moved in synchronism with said last named means, a photo-electric cell beyond said shutter device, a second source of light adapted to flash in synchronism with the impulses received by said cell by way of said shutter device, and markings on said supporting means adjacent said system, whereby displacement of an oscillatory part of said system from said markings may be determined.

8. An apparatus for comparing the natural frequency of a mechanical resilient oscillating system with a standard frequency, said system comprising a resilient element and a massive element connected to one end of said resilient element, said apparatus comprising a support, means for oscillating said support at a standard frequency, means connecting said support with a part of said resilient element remote from said massive element whereby oscillations are induced in the test system by the oscillations of said support, and means for detecting the phase displacement between the oscillations of the test system and those of the support at standard frequency said last named means including mechanism operatively responsive to the oscillations of said support.

9. An apparatus for comparing the natural frequency of a mechanical resilient oscillating system with a standard frequency, said system comprising a resilient element and a massive element connected to one end of said resilient element, said apparatus comprising a table, means for oscillating said table, a holder on said table, means for suspending said test system from the holder by the end of said resilient element remote from said massive element, whereby oscillations are induced in said test system as a whole, and means for detecting the phase displacement between the oscillations of the test system and those of the table at standard frequency said last named means including mechanism operatively responsive to the oscillations of the table.

10. An apparatus for comparing with a standard frequency the natural frequency of a mechanical resilient oscillatory system having a spring connected to a mass at one end and to a mounting member at the other, comprising a table having index markings, means for oscillating said table at the standard frequency, means for attaching said mounting member to said table, whereby the oscillations of said table are transmitted to the latter end of the spring, and means for indicating the displacement of an oscillating part of said system from an index mark on said table at a given moment in each cycle of movement of said table.

11. An apparatus for comparing with a standard frequency the natural frequency of a mechanical resilient oscillatory system having a spring connected to a mass at one end and to a mounting member at the other, comprising a table having index markings, a master spring control balance wheel having a natural frequency equal to the standard frequency, means for oscillating said balance wheel so that it has a larger amplitude of oscillations than that required for the table, an oscillatable mounting for said table such that the table has a natural frequency less than said standard frequency, means for applying a reaction force from the spring of said master balance wheel to said oscillatably mounted table, means for connecting said mounting member to the table whereby the oscillations of the table are transmitted to the system as a whole and means for indicating the displacement of an oscillating part of said system from said index marking on the table at a given moment in each cycle of movement of the table.

12. An apparatus for comparing with a standard frequency the natural frequency of a mechanical resilient oscillating test system having a spring connected to a mass at one end and to a mounting member at the other, said apparatus including, in combination, a normally fixed anchorage for the mounting member of said test system, means for applying forced vibrations of said standard frequency to said anchorage whereby, through the connection between the system and the anchorage, said test system oscillates as a whole while the mass may oscillate relatively to the anchorage, and means for indicating any difference in phase displacement between the system and anchorage, said last named means including mechanism operatively responsive to the oscillation of the anchorage.

13. An apparatus for comparing with a standard frequency the natural frequency of a balance spring having one end connected to a wheel and the other end to a mounting member, said apparatus including, in combination, a normally fixed support, means for securing the mounting member to said support, means for applying vibrations of the standard frequency to said support whereby, through said securing means and the connection between the mounting member and the spring, the spring, the wheel, and the mounting member are vibrated as a whole and wheel oscillates relatively to the support, and means for indicating any difference in phase displacement between the standard vibrations of the support and the induced vibrations of the wheel, said last named means including mechanism operatively responsive to the oscillations of said support.

14. An apparatus for comparing with a standard frequency the natural frequency of a plurality of mechanical resilient oscillating test systems each having a spring connected to a mass at one end and to a mounting member at the other, said apparatus including, in combination, a normally fixed support, means for securing the mounting member of each mechanical oscillating test system to said support, means for applying oscillations of small amplitude to said support of a frequency of the required standard periodicity whereby through said securing means and the connection between the mounting member and the spring, the test systems oscillate as a whole while the masses may oscillate relatively to the support, and means for indicating any difference in phase displacement between the oscillations of the support and each of the masses of the test systems and the sense of said displacement, said last named means including mechanism operatively responsive to the oscillations of said support.

FREDERICK WILLIAM MEREDITH.

REFERENCES CITED

The following references are of record in the file of this patent:

UNITED STATES PATENTS

| Number | Name | Date |
| --- | --- | --- |
| 964,743 | Bindschedler | July 19, 1910 |
| 1,779,122 | Franz | Oct. 21, 1930 |
| 1,900,612 | Owada | Mar. 7, 1933 |
| 2,094,057 | Brown | Sept. 28, 1937 |
| 2,183,655 | Morton | Dec. 19, 1939 |
| 2,358,078 | Kohlhagen | Sept. 12, 1944 |